(12) United States Patent
Tirkkonen

(10) Patent No.: US 8,031,800 B2
(45) Date of Patent: Oct. 4, 2011

(54) TRANSMITTING DIGITAL SIGNAL

(75) Inventor: Olav Tirkkonen, Helsinki (FI)

(73) Assignee: Amosmet Investments LLC, Dover, DE (US)

( * ) Notice: Subject to any disclaimer, the term of this patent is extended or adjusted under 35 U.S.C. 154(b) by 642 days.

(21) Appl. No.: 10/450,997

(22) PCT Filed: Dec. 19, 2001

(86) PCT No.: PCT/FI01/01133
§ 371 (c)(1),
(2), (4) Date: Nov. 13, 2003

(87) PCT Pub. No.: WO02/058311
PCT Pub. Date: Jul. 25, 2002

(65) Prior Publication Data
US 2004/0081254 A1 Apr. 29, 2004

(30) Foreign Application Priority Data
Dec. 22, 2000 (FI) ..................................... 20002845

(51) Int. Cl.
*H04L 27/00* (2006.01)
(52) U.S. Cl. ......................... 375/295; 375/299
(58) Field of Classification Search .................. 375/299, 375/295
See application file for complete search history.

(56) References Cited

U.S. PATENT DOCUMENTS

| | | | |
|---|---|---|---|
| 5,848,103 A * | 12/1998 | Weerackody | 375/295 |
| 6,088,408 A | 7/2000 | Calderbank et al. | |
| 6,097,771 A | 8/2000 | Foschini | |
| 6,178,196 B1 | 1/2001 | Naguib et al. | |
| 6,307,851 B1 | 10/2001 | Jung et al. | |
| 6,317,411 B1 | 11/2001 | Whinnett et al. | |
| 6,317,466 B1 | 11/2001 | Foschini et al. | |
| 6,359,874 B1 * | 3/2002 | Dent | 370/342 |
| 6,445,730 B1 | 9/2002 | Greszczuk et al. | |
| 6,631,168 B2 | 10/2003 | Izumi | |
| 6,741,658 B1 | 5/2004 | Ionescu | |
| 6,760,388 B2 * | 7/2004 | Ketchum et al. | 375/295 |

(Continued)

FOREIGN PATENT DOCUMENTS

EP 0 905 920 3/1999

(Continued)

OTHER PUBLICATIONS

Tirkkonen et al, Minimal Non-Orthogonality Rate 1 Space-Time Block Code for 3+ Tx, Sep. 6-8, 2000, pp. 429-432.*

(Continued)

*Primary Examiner* — Chieh M. Fan
*Assistant Examiner* — Freshteh N Aghdam
(74) *Attorney, Agent, or Firm* — Knobbe, Martens, Olson & Bear, LLP

(57) ABSTRACT

An arrangement for coding digital symbols and transmitting them through at least two antennas. A coder reads at least two symbols belonging to the same transmission block and forms channel symbols of the symbols of the transmission block by means of a block code. The coder multiplies at least one symbol belonging to the transmission block by a first nonzero weighting coefficient and at least one symbol belonging to the transmission block by a second nonzero weighting coefficient, and the division ratio of the first and second weighting coefficients differs from values $\pm 1$, $\pm j$ and $\pm 1/\mathrm{sqrt}(2)$. The thus formed channel symbols are transmitted to the radio path through the antennas.

48 Claims, 6 Drawing Sheets

U.S. PATENT DOCUMENTS

| | | | |
|---|---|---|---|
| 6,865,237 B1 | 3/2005 | Boariu et al. | |
| 6,922,447 B1 | 7/2005 | Ionescu | |
| 7,006,848 B2 | 2/2006 | Ling et al. | |
| 7,061,854 B2* | 6/2006 | Tarokh et al. | 370/206 |
| 2001/0040928 A1 | 11/2001 | Sakoda | |
| 2003/0147343 A1* | 8/2003 | Onggosanusi et al. | 370/209 |
| 2004/0071240 A1 | 4/2004 | Betts | |
| 2004/0243904 A1 | 12/2004 | Kim et al. | |
| 2005/0190853 A1 | 9/2005 | Tirkkonen | |
| 2005/0201481 A1 | 9/2005 | Calderbank et al. | |

FOREIGN PATENT DOCUMENTS

| | | |
|---|---|---|
| GB | 2237706 | 5/1991 |
| WO | WO 97/41670 | 11/1997 |
| WO | WO 99/14871 | 3/1999 |
| WO | WO 99/23766 | 5/1999 |
| WO | WO 00/11806 | 3/2000 |
| WO | WO 00/18056 | 3/2000 |
| WO | WO 00/49780 | 8/2000 |
| WO | WO 00/51265 | 8/2000 |
| WO | WO 01/05060 | 1/2001 |
| WO | WO 01/19013 | 3/2001 |
| WO | WO 01/63826 | 6/2001 |
| WO | WO 01/54305 | 7/2001 |
| WO | WO 01/56218 | 8/2001 |
| WO | WO 01/69814 | 9/2001 |
| WO | WO 01/76094 | 10/2001 |
| WO | WO 02/43313 | 5/2002 |

OTHER PUBLICATIONS

Tirkkonen et al, Improved MIMO Performance with Non-Orthogonal Space-Time Block Codes, Nov. 25-29, 2001, IEEE Global Telecommunications Conference (GLOBECOM 2001), pp. 1122-1126.*
"Design of Space-Time Codes With Optimal Coding Gain", Mukkavilli et al, In: the 11$^{th}$ IEEE International Symposium on Personal, Indoor and Mobile Radio Communications, PIMRC 2000, Sep. 18-21, 2000, vol. 1, pp. 495-499.
"Minimal Non-Orthogonality Rate 1 Space-Time Block Code for 3+ Tx Antennas", Tirkkonen et al, In: IEEE 6$^{th}$ Int. Symposium on Spread-Spectrum Tech & Appli., Sep. 6-8, 2000, pp. 429-432.
"A quasi-orthogonal space-time block code", H. Jafarkhani, In: Wireless Communications and Networking Conference, 2000, Sep. 23-28, 2000, vol. 1, pp. 42-45.
"Maximal Symbolwise Diversity in Non-Orthogonal Space-Time Block Codes", Tirkkonen, In: ISIT200I, Jun. 24-29, 2001, p. 197.
Alamouti, S. M., et al.: Trellis-Coded Modulation and Transmit Diversity: Design Criteria and Performance Evaluation, 1998 IEEE: pp. 703-707, IEEE, Los Alamitos, CA.
Alamouti, S. M.: "A Simple Transmit Diversity Technique for Wireless Communicatio ns." IEEE Journal on Selected Areas in Communications, IEEE Inc. New York, US, vol. 16, No. 8, Oct. 1998. pp. 1451-1458, XP002100058, ISSN:0733-8716.
Calderbank, A., et al.: Space-Time Codes for Wireless Communication: 1997 IEEE, ISIT 1997, Ulm, Germany, Jun.29-Jul.4: p. 146.
Calderbank et al: "Cochannel Interference Suppression Through Time/Space Diversity", IEEE Transactions on Information Theory, May 2000, vol. 46, pp. 922-932.
Damen, O., et al.: Lattice Code Decoder for Space-Time Codes: IEEE 2000: p. 161-p. 163; 1069-7798/00; IEEE Communications Letters. vol. 4. No. 5. May 2000.
Damen, M.O. et al: "A Study of Some-Time Codes with Rates Beyond One Symbol per Channel Use", IEE Global Telecommunications Conference, 2001, vol. 1, pp. 445-449.
Foschini, G.: Layered Space-Time Architecture for Wireless Communication in a Fading Environment When Using Multi-Element Antennas: Bell Labs Technical Journal, 1996: pp. 41-59, John Wiley & Sons, Inc., Hoboken, NJ.
Ganesan, G. et al: "Space-Time Diversity Using Orthogonal and Amicable Orthogonal Designs", IEEE International Conference on Acoustics, Speech and Signal Processing, 2000, vol. 5, pp. 2561-2564.
Hassibi, B., et al.: "High-Rate Codes that are Linear in Space and Time", Aug. 22, 2000, 55 pp., Bell Laboratories, Lucent Technologies, Murray Hill, NJ 07974 USA.
Hassibi, B. et al: High-rate Linear Space-Time Codes, Acoustics, Speech and Signal Processing 200 Proceedings, pp. 2461-2464, May 2001.
Hochwald, et al., "Systematic Design of Unitary Space-Time Constellations," Technical Report, Bell Laboratories, Lucent Technologies, Sep. 1998, revised Oct. 1999 and Mar. 2000, pp. 1-27, Murray Hill, NJ.
Lin et al: "Layered Space-Time Codes for Wireless Communications Multiple Transmit Antennas", p. 436-p. 440.
Lo, T., et al,; Space-time Block Coding-From a Physical Perspective; 1999 IEEE; pp. 150.153; 0-7803-5668-3/99, IEEE, Los Alamitos, CA.
Shiu, D. et al.; "Scalable Layered Space-Time Codes for Wireless Communications: Performance Analysis and Design Criteria," 1999 IEEE, pp. 159-163, 0-7803-5668-3/99, University of California Berkeley, CA.
Shiu, D., et al.; "Layered Space-Time Codes for Wireless Communication Using Multiple Transmit Antennas": 1999 IEEE, pp. 436-440, 0-7803-5284-X99, IEEE, University of California at Berkeley, CA.
Stamoulis, A. et al: "Space-Time Block-Coded OFDMA with Linear Precoding for Multirate Services", IEEE Transactions on Signal Processing, vol. 50, No. 1, pp. 119-129, Jan. 2002.
Tarokh, V., et al.: "Space-Time Block Coding for Wireless Communications: Performance Results," IEEE Journal on Selected Areas in Communications, IEEE Inc. New York, US, vol. 17, No. 3, Mar. 1999, pp. 451-460 XP000804974 ISSN: 0733-8716 equations (6) and (7).
Tarokh, V., et al., "Space-Time Block Codes from Orthogonal Designs," IEEE Transactions on Information Theory Jul. 1999, vol. 45, No. 5, IEEE, Los Alamitos, CA.
Tarokh, V., et al., "Space-Time Codes for High Data Rate Wireless Communication Performance Criteria in the Presence of Channel Estimation Errors, Mobility, and Multiple Paths," IEEE Transactions on Communications, Feb. 1999, vol. 47, No. 2, IEEE, Los Alamitos, CA.
Tirkkonen, O., et al., "Complex Space-Time Block Codes for Four Tx Antennas," IEEE, 2000, pp. 1005-1009, 0-7803-6451-1/00.
Tirkkonen, O., et al., "The Algebraic Structure of Space-Time Block Codes," Finnish Wireless Communications Workshop, FWCW'00, May 30, 2000, pp. 80-84, Oulu, Finland.
Tirkkonen, O. et al: "Square-Matrix Embeddable Space-Time Block Codes for Complex Signal Constellations", IEEE Transactions on Information Theory, vol. 48, No. 2, Feb. 2002.
Ganesan G. et al: "Space-Time Block Codes: A Maximum SNR Approach", IEEE Transactions on Information Theory, vol. 47, No. 4, May 2001.
Guey, J.C.: "Concatenated Coding for Transmit Diversity Systems" Procedings of the 1999 VTC-Fall IEEE VTS 50th Vehicular Technology Conference 'Gateway to 21st Century Communications Village,' Sep. 19-Sep. 22, 1999, pp. 2500-2504, vol. 5, Amsterdam, NL.
Holma. H., et al., ED.; WCDMA for UMTS Radio Access for Third Generation Mobile Communications: Reprinted Jun. 2000: p. 97: John Wiley & Sons, Ltd., West Sussex, England.
Hottinen, A., et al.; Closed-Loop Transmit Diversity Techniques for Multi-Element transceivers: IEEE 2000: p. 70-73; 0-7803-6507-0/00, IEEE, Los Alamitos, CA.
Ionescu, D.M.,:"New Results on Space-Time Code Design Criteria," 1999 IEEE, pp. 684-687, 0-7803-5668-3/99, IEEE, Los Alamitos, CA.
Jalloul, L.M.A., et al.; Performance Analysis of CDMA Transmit Diversity Methods: 1999 IEEE: pp. 1326-1330; 0-7803-5435-4/99, IEEE, Los Alamitos, CA.
Lindskog, E. and Poulraj, A, "A transmit diversity scheme for channels with intersymbol interferenc," in Proc. IEEE ICC2000, 2000, vol. 1, pp. 307-311.
Naguib, A.F., et al., Space-Time Coded Modulation for High Data Rate Wireless Communications; 1997 IEEE; pp. 102-109; 0-7803-4198-8/97, IEEE, Los Alamitos, CA.

Naguib, A.: "On the matched filter bound of transmit diversity techniques," in Proc. IEEE ICC2001, Jun. 2001.

Seshadri, N. et al.; "Space-Time Codes for Wireless Communication: Code Construction,": 1997 IEEE, pp. 637-641; 0-7803-3659-3/97, IEEE, Los Alamitos, CA.

Sweatman, C., et al.; A comparison of Detection Algorithms including BLAST for Wireless Communication using Multiple Antennas; IEEE 2000; pp. 698-703, 0-7803-6465-5/00, IEEE, Los Alamitos, CA.

Tarokh, V., et al.; A Differential Detection Scheme for Transmit Diversity: 1999 IEEE; pp. 1043-1047; 0-7803-5668-3/99 IEEE, Los Alamitos, CA.

Tarokh, V., et al., "New Detection Schemes for Transmit Diversity with No Channel Estimation," 1998 IEEE, pp. 917-920, 0-7803-5106-1/98, IEEE, Los Alamitos, CA.

Tarokh, V., et al., "Space-Time Codes for High Data Rate Wireless Communication: Performance Criterion and Code Construction," IEEE Transactions on Information Theory, Mar. 1998, vol. 44, No. 2, IEEE, Los Alamitos, CA.

Tarokh, V., et al., "The Application of Orthogonal Designs to Wireless Communication," 1998 IEEE, pp. 46-47, 0-7803-4408-1/98, IEEE, Los Alamitos, CA.

\* cited by examiner

TRANSMITTING DIGITAL SIGNAL

FIELD OF THE INVENTION

The field of application of the invention is the transmission of a digital signal, the invention relates especially to the block coding of a signal for transmission through more than one antenna.

BACKGROUND OF THE INVENTION

As is well known, the transmission path used for the transmission of signals in telecommunications connections causes interference to telecommunications. This occurs regardless of the physical form of the transmission path, whether it is a radio link, optical fibre or copper cable. Especially in radio communications, there are often situations, in which the quality of the transmission path varies from one connection to another and even during a connection. Fading of the radio path is one typical phenomenon that causes changes in the transmission channel. Other simultaneous connections can also cause interference that may change with time and location. In a typical radio communications environment, signals between a transmitter and receiver propagate along several routes. This multipath propagation occurs mainly due to the fact that the signal reflects from the surrounding surfaces. The signals that have propagated along different routes arrive at the receiver at different times due to their different propagation delays. Different methods have been developed to compensate for the fading caused by multipath propagation.

One of the most effective ways to compensate for the fading on the radio path is controlling the transmission power of the transmitter. If the properties of the radio path are known, the power of the transmitter can be controlled in such a manner that the effect of the fading can be eliminated. In practice, such a solution is, however, very difficult to implement, because firstly, the transmitter should know the quality of the channel, and transmitting this information to the transmitter in real time is difficult. Secondly, transmission power restrictions set on transmitters and the dynamic range of transmitters set their own limitations. In addition, power control in itself may lead to ineffective transmission by increasing power to a high level in fading dips. A second solution to the problem is using diversity in the transmitter. Time diversity employs interleaving and coding to provide temporal diversity to the transmitted signal. However, this has the drawback that it causes delays in the transmission especially when the channel is a slow-fading one. In frequency diversity, the signal is transmitted on several frequencies at the same time. This is, however, an ineffective method when the coherence bandwidth of the channel is wide.

In transmission antenna diversity, the same signal or different parts of the same signal are transmitted to the receiver by using two or more antennas. The signal components that multipath-propagated through different channels will then probably not suffer from interference from a simultaneous fading. Publication WO 99/14871 discloses a diversity method especially suited for two antennas, in which the symbols to be transmitted that are made up of bits are coded in blocks of given lengths and in which each block is coded to contain a given number of channel symbols according to formula (1).

$$C_{Ala} \rightarrow \begin{pmatrix} z_1 & z_2 \\ -z_2^* & z_1^* \end{pmatrix} \quad (1)$$

In the formula, the horizontal lines of the matrix show transmission time instants so that the upper horizontal line shows information transmitted at time instant t and the lower horizontal line shows information transmitted at time instant t+T, wherein T refers to a symbol cycle. The vertical lines of the matrix in turn show antennas so that the first vertical line shows information transmitted through antenna 1 and the second vertical line shows information transmitted through antenna 2. However, a block code of complex modulation as shown in formula (1) only exists for a maximum of two antennas. A maximum data transmission rate, i.e. coding rate, transmitted to more than two antennas is calculated according to formula (2), where N is the number of transmission antennas and the square brackets indicate the smallest integer that is greater than or equal to the expression in brackets. It should be noted that herein the coding rate refers to a symbol-coding rate, i.e. the number of symbols transmitted during a symbol cycle T. For a third and fourth antenna, the maximum coding rate for an orthogonal code is ¾.

$$\text{Rate} = \frac{\lceil \log_2 N \rceil + 1}{2^{\lceil \log_2 N \rceil}} \quad (2)$$

Publication Tirkkonen, Boariu, Hottinen, IEEE 6th Symposium on Spread-Spectrum Tech. & Appli., NJIT, New Jersey, USA, September 2000, discloses some solutions of a full coding rate 1. The publication describes a coding method, in which a non-orthogonal block code according to formula (3) having four antennas is formed by utilizing an orthogonal Alamout matrix according to formula (1).

$$(z_1, z_2, z_3, z_4) \rightarrow \begin{pmatrix} z_1 & z_2 & z_3 & z_4 \\ -z_2^* & z_1^* & -z_4^* & z_3^* \\ z_3 & z_4 & z_1 & z_2 \\ -z_4^* & z_3^* & -z_2^* & z_1^* \end{pmatrix} \quad (3)$$

The matrix is of form ABBA according to presentation method (4), in which the A matrix follows the Alamout matrix for symbols $z_1$ and $z_2$, whereas B follows the Alamout matrix for symbols $z_3$ and $z_4$.

$$\begin{pmatrix} A & B \\ B & A \end{pmatrix} \quad (4)$$

Known non-orthogonal block codes do, however, contain a significant drawback. Said block codes do not have full diversity, i.e. the number of independently decoded channels is smaller than the number of antennas, whereby transmission capacity provided by the antennas is lost. The diversity of the block code is the smallest number of nonzero eigenvalues.

$$H_{ce} = D_{ce}{}^H D_{ce}, \quad (5)$$

where $D_{ce}$ is defined by formula (6).

$$D_{ce} = C_c - C_e \quad (6)$$

In the above, $C_c$ is a transmitted code matrix and $C_e$ a detected defective code matrix. In the case of a channel symbol pair, in which the same error Δ occurs with symbols $z_1$ and $z_3$ and no error occurs with symbols $z_2$ and $z_4$, a matrix according to formula (7) is obtained as the difference matrix $D_{ce}$.

$$D_{ce} = \begin{pmatrix} \Delta & 0 & \Delta & 0 \\ 0 & \Delta^* & 0 & \Delta^* \\ \Delta & 0 & \Delta & 0 \\ 0 & \Delta^* & 0 & \Delta^* \end{pmatrix} \quad (7)$$

The matrix according to formula (7) is singular, i.e. the matrix does not have an inverse matrix. The matrix has only two nonzero eigenvalues, 2Δ and 2Δ*. Thus, the diversity degree of the ABBA block code according to formula (3) is only 2. Low diversity begins to show in the coding performance as a decreasing bit error rate when the bit energy to interference level ratio exceeds 5 dB.

BRIEF DESCRIPTION OF THE INVENTION

It is thus an object of the invention to provide a method and an apparatus implementing the method in such a manner that coding achieves full diversity when two or more transmission antennas are used. This is achieved by a method for transmitting digital symbols, in which method at least two complex symbols belonging to the same transmission block are read in the transmitter. In the method, a non-orthogonal block code comprising channel symbols is formed from the symbols belonging to the transmission block by performing at least one of the following operations to each symbol: repetition, conjugation, multiplying by a weighting coefficient, summing two or more symbols, and multiplying at least one symbol belonging to the transmission block by a first nonzero weighting coefficient and at least one symbol belonging to the transmission block by a second nonzero weighting coefficient, the division ratio of the first and second weighting coefficients differing from values ±1, ±j and ±1/sqrt(2), and transmitting the formed channel symbols via two or more transmission antenna routes.

The invention also relates to an arrangement for transmitting digital symbols, comprising a coder for coding digital symbols into channel symbols, and one or more transmission antennas connected to the coder for transmitting the channel symbols. The coder is arranged to read at least two complex symbols belonging to the same transmission block and, by means of the non-orthogonal block code defining the coding, to form channel symbols of the symbols belonging to the transmission block by performing at least one of the following operations to each symbol: repetition, conjugation, multiplying by a weighting coefficient, summing two or more symbols, the coder being arranged to multiply at least one symbol belonging to the transmission block by a first nonzero weighting coefficient and at least one symbol belonging to the transmission block by a second nonzero weighting coefficient, the division ratio of the first and second weighting coefficients differing from values ±1, ±j and ±1/sqrt(2), and the arrangement being arranged to transmit the formed channel symbols via two or more transmission antenna routes formed by means of said one or more antennas.

Preferred embodiments of the invention are disclosed in the dependent claims.

The invention thus relates to a method and apparatus for performing a space-time block coding in a radio transmitter. A certain number of symbols are read during block coding and coded into channel symbols for transmission at different time instants and through at least two transmission antennas. The number of reception antennas is not essential for the invention. The inventive solution is based on having at least two symbols in the transmission block that are multiplied by nonzero weighting coefficients in such a manner that the division ratio of the coefficients differs from values ±1 and ±j.

The code matrix of the invention fulfils the requirement of maximum symbol-wise diversity. This means that if all other symbols except one were removed from the code matrix, the code matrix would be unitary with respect to the remaining symbol. The above-mentioned condition applies to all code matrix symbols. Thus, equation (8) applies to the symbol-wise code matrix $C_k$ of code matrix C. The symbol-wise code matrix $C_k$ refers herein to a code matrix, in which all other symbols except $z_k$ are replaced by zeros.

$$C_k^H C_k \approx |z_k|^2 I_N \quad (8)$$

In equation (8), $C^H$ is a Hermitian conjugate of matrix C, i.e. a transpose of a complex conjugate, |z| is the absolute value of z, and $I_N$ is an N-dimensional identity matrix. If M=N, the simplest way of detecting symbol-wise unitarity is to form a symbol-wise matrix $C_k$, in which case exactly one symbol on each horizontal and vertical line is $z_k$ or its complex conjugate while the other elements are zero.

A general code matrix that fulfils the full symbol-wise diversity can be formed as follows. An integer $n_k$ between $1 \leq n_k \leq N$, where N is the number of transmission antennas, is selected for each symbol $z_k$. An N×N matrix is formed, in which $n_k z_k$'s and N-$n_{k z_k}$*'s are on the diagonal of the matrix. If delay M is longer than N, a zero matrix is added to matrix (M–N)×N. Let us call the obtained matrix $\gamma_k$ and form a general $C_k$ according to equation (9).

$$C_k = U_k \gamma_k V_k \quad (9)$$

The general code matrix C that fulfils the full symbol-wise diversity is of the form shown in formula (10)

$$C = \sum_{k=1}^{K} C_k = \sum_{k=1}^{K} U_k \gamma_k V_k, \quad (10)$$

where $U_k$ is a unitary M×M matrix and $V_k$ is a unitary N×N matrix. In the inventive solution, matrices $U_k$, $V_k$ have at least one element not belonging to the value range {0,±1,±j}.

The code matrix of the invention should preferably be such that the non-orthogonality matrix formed by means of the Hermitian square of the code matrix is traceless. Otherwise, bits coded into some of the symbols would be non-homogeneously coded—for instance an error in the detection might be more probable if bit 0 is transmitted instead of bit 1. The code matrix is also preferably required to have symbol-level homogeneity, i.e. that all symbols have an equal position with respect to each other in the code matrix.

In a preferred embodiment of the invention, all symbols of the block code are formed using the same modulation constellation, but for at least one symbol, the modulation constellation is phase-rotated in relation to the other symbols in the block. For QPSK symbols, for instance, the phase rotation in codes according to equation (3) is preferably between 25 and 65 degrees. In a second preferred embodiment of the invention, two or more symbols are summed when forming the channel symbol of a block-coding matrix. In one preferred embodiment, one symbol is multiplied by a weighting coefficient and then summed with another symbol from one or more blocks to form the channel symbol.

Preferably, at least two symbols belonging to the transmission block are coded orthogonal with each other, even though as a whole, the block code of the invention is non-orthogonal. For instance, in the case of a four-symbol block, one preferred embodiment is a non-orthogonal 2+2 matrix, in which two symbols are coded orthogonal with each other and the two remaining symbols are correspondingly coded orthogonal with each other. Another preferred embodiment is a 3+1 block code, in which three symbols are coded orthogonal with each other. The invention is not limited to whether the block matrix is power-balanced or not.

The invention provides significant advantages. The coding rate of the code matrix can be made higher than the coding rate allowed by orthogonality, and by weighting one or more symbols by a complex weighting coefficient, the invention enables the presentation of a code matrix that achieves full diversity. The solution of the invention provides significant advantages in the level of the bit error rate (BER) in comparison with the prior art solution, especially at high signal-to-noise ratios (SNR).

BRIEF DESCRIPTION OF THE FIGURES

The invention will now be described in more detail by means of preferred embodiments and with reference to the attached drawings, in which.

DETAILED DESCRIPTION OF THE INVENTION

The invention can be used in radio systems, in which it is possible to transmit at least a part of a signal by using two or more transmission antennas or two or more lobes provided by two or more transmission antennas. The transmission channel can be established using a time-division, frequency-division, or code-division symbol multiplexing or multiple access method. Systems using combinations of different multiple access methods are also systems of the invention. The examples describe the use of the invention in a UMTS (Universal Mobile Telephony System) system employing a wideband code-division multiple-access method implemented by a direct sequence technique, without limiting the invention to it, however.

Figure 1:
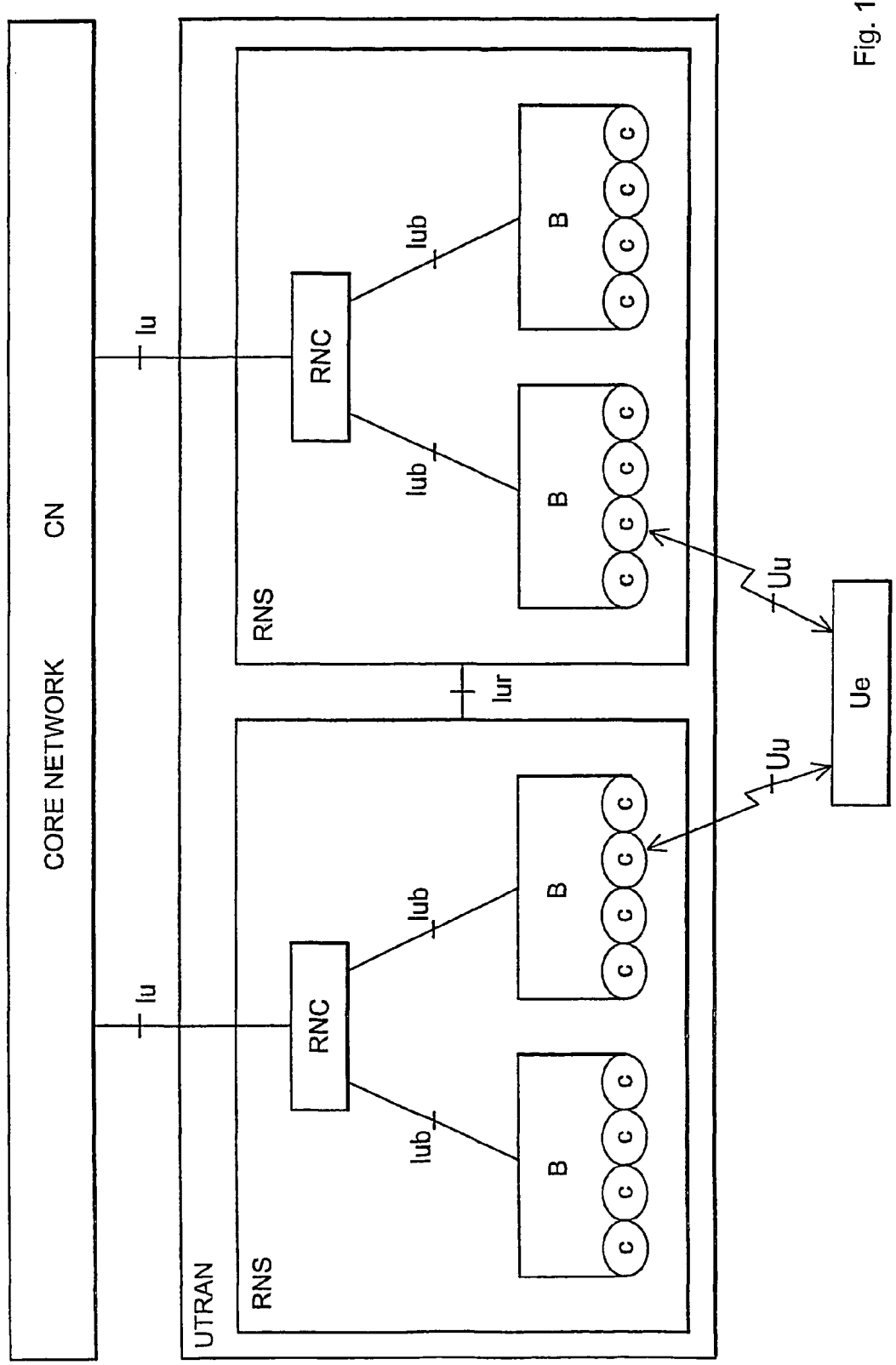
FIG. 1 shows an example of a system according to an embodiment of the invention.

The structure of a mobile system is described by way of example with reference to FIG. 1. The main parts of the mobile system are a core network CN, a UMTS terrestrial radio access network UTRAN and user equipment UE. The interface between CN and UTRAN is called Iu and the air interface between UTRAN and UE is called Uu. UTRAN is made up of radio network subsystems RNS. The interface between RNSs is called Iur. RNS is made up of a radio network controller RNC and one or more nodes B. The interface between RNC and B is called Iub. The service area, i.e. cell, of the node B is marked with C in the figure.

Figure 2:
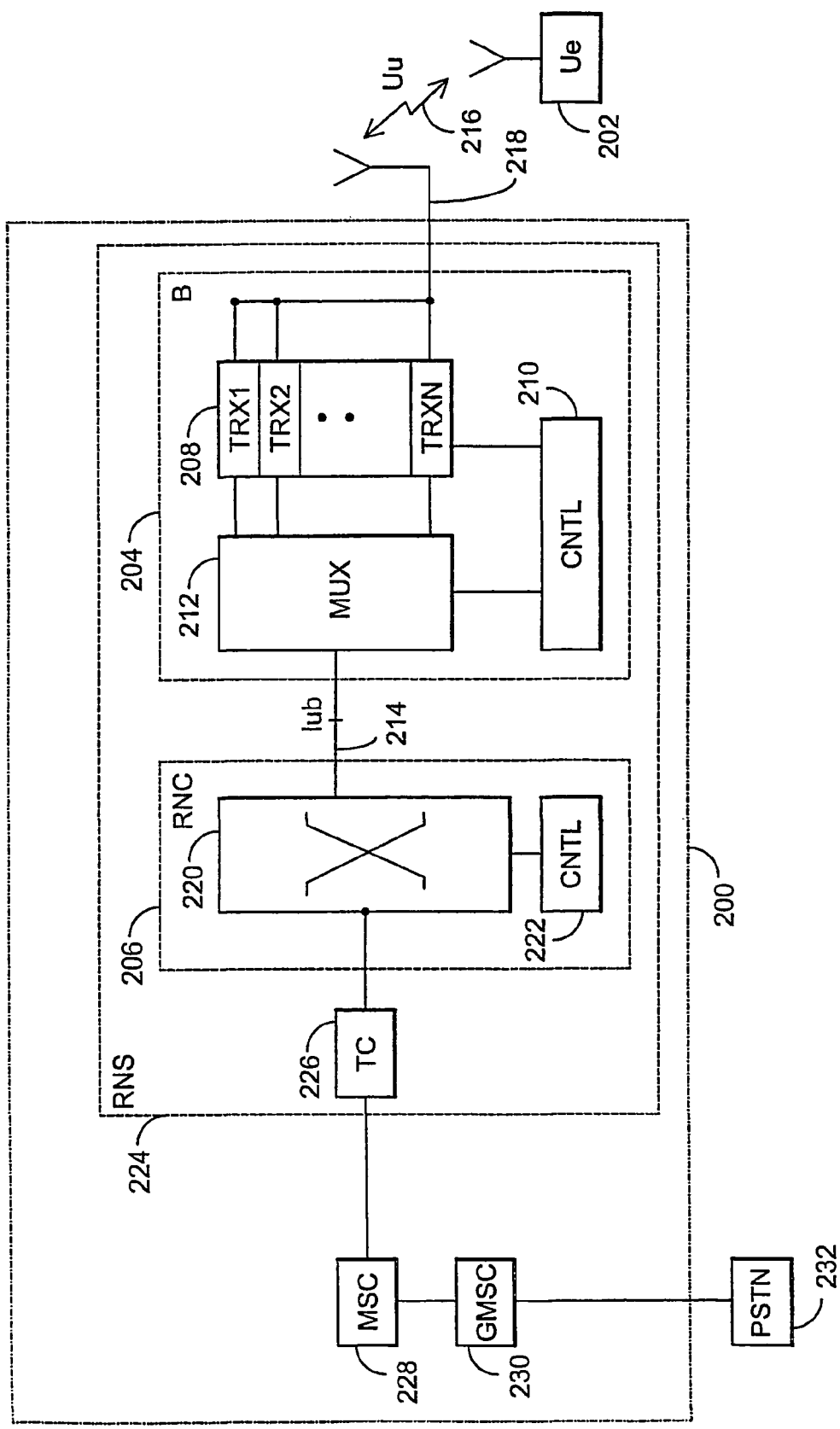
FIG. 2 shows a second example of a system according to an embodiment of the invention.

The description in FIG. 1 is rather general, so it is clarified in the more detailed example of a cellular radio system in FIG. 2. FIG. 2 only contains the most essential blocks, but it is apparent to a person skilled in the art that a conventional cellular radio network also comprises other functions and structures that need not be described in more detail herein. It should also be noted that FIG. 2 only shows one exemplary structure. In systems of the invention, the details may differ from those shown in FIG. 2, but these differences have no relevance to the invention. A cellular radio network thus typically comprises a fixed network infrastructure, i.e. network part 200, and user equipment 202 that may be fixedly installed equipment, equipment installed in a vehicle or portable equipment. The network part 200 has base stations 204. The base station 204 corresponds to a node B of the previous figure. A radio network controller 206 controls in a centralized manner several base stations 204 connected to it. The base station 204 has transceivers 208 and a multiplexing unit 212.

The base station 204 further has a control unit 210 that controls the operation of the transceivers 208 and the multiplexer 212. The multiplexer 212 places the traffic and control channels used by several transceivers 208 on one transmission connection 214. The transmission connection 214 forms an interface Iub.

The transceivers 208 of the base station 204 are connected to an antenna unit 218 implementing a bi-directional radio connection 216 to the user equipment 202. The structure of frames transmitted in the bi-directional radio connection 216 is defined specifically for each system and is called an air interface Uu.

The radio network controller 206 comprises a group-switching field 220 and a control unit 222. The group-switching field 220 is used to switch speech and data and to connect signaling circuits. A radio network subsystem 224 formed by the base station 204 and the radio network controller 206 also comprises a transcoder 226. The transcoder 226 is usually located as close to a mobile switching center 228, as possible, because speech can then be transmitted in cellular radio network format between the transcoder 226 and the radio network controller 206, saving transmission capacity. The transcoder 226 transforms the different digital speech coding formats used between a public telephone network and a radio telephone network to be compatible with each other, for instance from a fixed network format to a cellular radio network format and vice versa. The control unit 222 takes care of call control, mobility management, collection of statistics and signaling. FIG. 2 further shows the mobile switching center 228 and a gateway mobile switching center 230 that manages the external connections of the mobile telephone system, in this example to a public telephone network 232.

Figure 3:
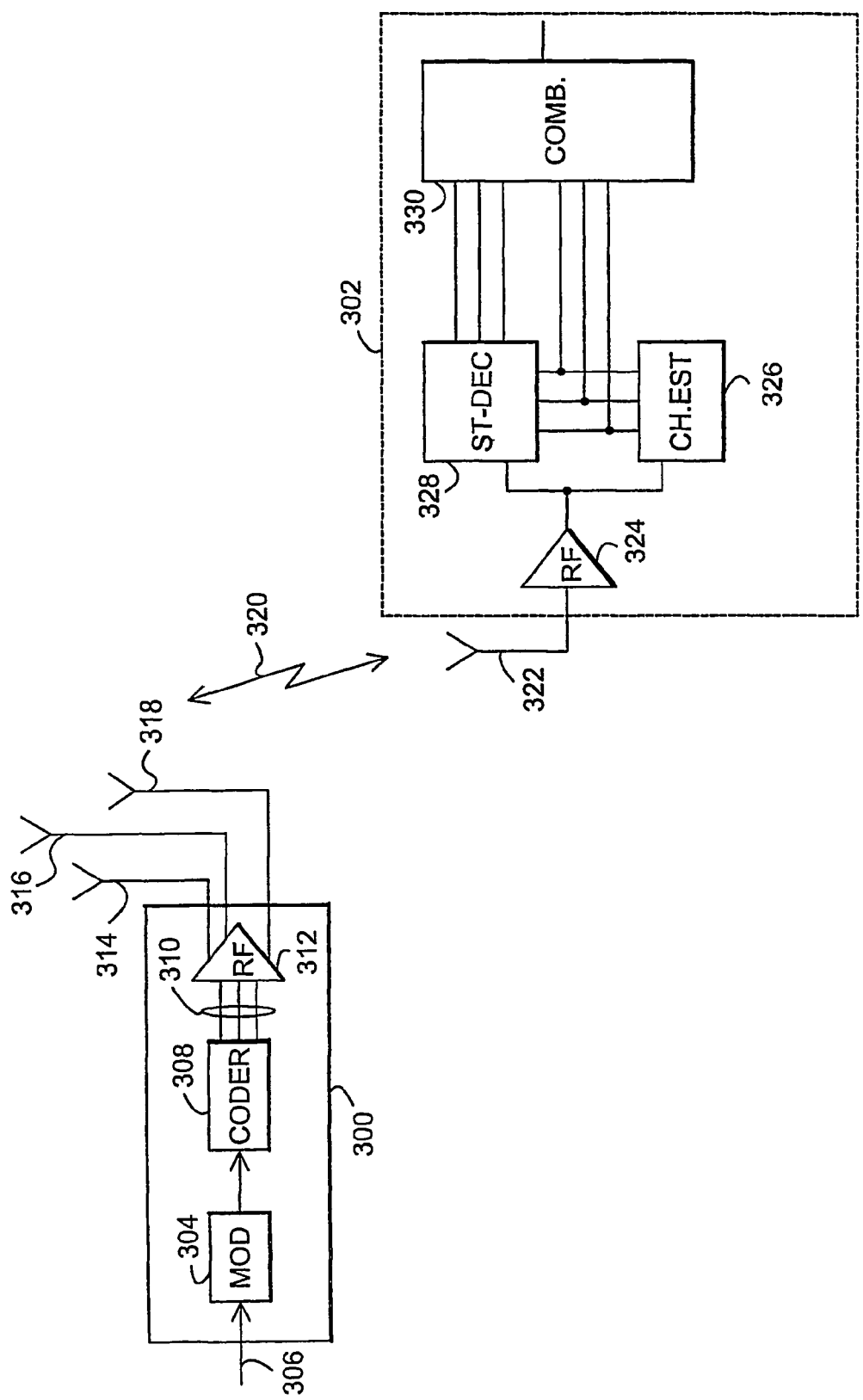
FIG. 3 illustrates an example of an arrangement according to an embodiment of the invention.

FIG. 3 illustrates an example of an arrangement according to an embodiment of the invention. The figure shows a situation, in which channel-coded symbols are transmitted through three antennas 314 to 318 in different time slots. The figure shows a transmitter 300 that is connected to a receiver 302 through a radio connection 320. The transmitter 300 comprises a modulator 304 that reads as input a signal 306 to be transmitted, which in the solution according to the preferred embodiment of the invention is made up of bits. It is not significant to the invention, what these bits are, they may come from a source coder through a channel coder and/or bit interleaver, for instance. The bits are modulated into symbols in a modulator 304. The symbols to be transmitted are grouped into transmission blocks of a given length, such as four symbols. A coder 308 performs operations according to the method of the invention to the symbols, the operations being for instance repetition, conjugation, nulling, forming a negation, multiplying by a weighting coefficient and summing symbols. In forming channel symbols, the coder 308 uses a block code that defines the connection between the symbols read from the modulator 304 and the channel symbols to be transmitted to the radio channel. The block code comprises N*M channel codes, where N and M are positive integers, N meaning the number of transmission antenna routes and M the delay of the block code. According to the inventive solution, at least two symbols are multiplied by nonzero weighting coefficients in such a manner that the division ratio of said weighting coefficients is not within the value range $\{0, \pm 1, \pm j\}$. In one preferred embodiment, the symbol multiplied by a weighting coefficient is summed with at least one other symbol to form a channel symbol, and zero or more of the other symbols are multiplied by a weighting coefficient in the same manner as the first symbol.

The coder 308 is connected to the transmission antennas 314 to 318 through radio frequency parts 312. In the case of FIG. 3, for instance, the channel symbols 310 are taken through the radio frequency parts 312 for transmission by the three antennas 314 to 318. Two or more transmission antenna routes can be achieved by means of two or more antennas or by means of two or more antenna lobes that in turn are achieved using at least two antennas and a suitable phasing or complex weighting. The invention is not limited to what data transmission resources are used to transmit the channel symbols on the radio path, but instead the data transmission resources can be made up of several time slots, different spreading codes or different frequencies.

Next, the invention will be described by means of a non-orthogonal block code designed for N antennas and transmitting K symbols in M symbol cycles, where K is more than M times the maximum orthogonal coding rate allowed by equation (2). The code matrix is required to have full symbol-wise diversity that is described by equations (8) and (9). This means that the code provides a full N-fold diversity protection against bit errors in one symbol, which can be considered a basic requirement for the code providing at least an approximately full diversity protection.

The coding and modulation methods can be taken as selecting points in a point space. Depending on the used method and channels, there always is a metric defining the geometry of the alphabet. Some points of the alphabet are closer to each other than others. The performance depends greatly on the distances between the closest neighbouring points. Optimally, the points have equal positions, so the distance to the closest neighbours should not be dependent on the selected points. This is called the homogeneity principle. From the homogeneity principle follows that traceless non-orthogonality can be required of a block code. The Hermitian square of the block code fulfilling the one-symbol diversity requirement described above can be shown as equation (11).

$$C^H C = \sum_{k=1}^{K} |z_k|^2 I + X, \quad (11)$$

where $$X = \sum_{i<k} C_i^H C_k + C_k^H C_i \quad (12)$$

It is now required of the preferred code matrix that the non-orthogonality matrix X shown in equation (12) is traceless (13).

$$TrX=0. \quad (13)$$

The above can be argued as follows. The form of matrix X shows that it is a Hermitian matrix, which means that its diagonal elements are real. Because X is a bilinear combination of matrices $C_k$ that are linear with respect to symbols $z_k$, the real diagonal values of X must be real linear combinations of the following: $\text{Re}[z_k z_l]$, $\text{Re}[z_k z_l^*]$, $\text{Im}[z_k z_l]$, $\text{Im}[z_k z_l^*]$.

The performance of block codes is greatly dependent on the properties of the squared difference matrix (5) of code words. The trace of matrix $H_{ce}$ is the Euclidian distance between the symbol constellations $C_e$ and $C_c$. In a linearly coded code, the difference matrices (6) of code words use the equations (11, 12) filled by the code matrices, where symbols $z_k$ are replaced by symbol differences $$\Delta_k = z_k^{(c)} - z_k^{(e)}. \quad (14)$$

Here, $z_k^{(c)}$ refers to the transmitted symbols and $z_k^{(e)}$ to symbols possibly received with errors. This way, the difference matrix of the code words complies with form (14), in which case the squared matrix $H_{ce}$ is of form (15).

$$H_{ce} = \sum_{k=1}^{K} |\Delta_k|^2 I + X(\Delta_k) \quad (15)$$

The trace of matrix $H_{ce}$ has two parts, $$N \sum_{k=1}^{K} |\Delta_k|^2$$

from the first term and $\text{Tr}(X(\Delta_k))$. The latter is a linear combination of the following: $\text{Re}[\Delta_k \Delta_l]$, $\text{Re}[\Delta_k \Delta_l^*]$, $\text{Im}[\Delta_k \Delta_l]$, $\text{Im}[\Delta_k \Delta_l^*]$. Now, if X has a non-disappearing trace, it means that the Euclidian distance between the constellations depends on the symbols. Thus, the modulation points are not homogeneously placed in the code space, so the code is clearly not homogeneous. The block code can then clearly not be optimal. It is thus advantageous to require that X is traceless.

Let us now concentrate on describing preferred embodiments when N=4, M=4 and K=4, i.e. the coding rate is 1. In the preferred embodiment in question, symbol-level homogeneity is required, i.e. that all symbols have an equal position with respect to each other in the code matrix. Further, in the preferred embodiment, the code matrix also has a maximum residual orthogonality. In a four-antenna 2+2 embodiment according to these requirements, two symbols $z_1$ and $z_2$ are coded orthogonally with each other in a pair, as are the remaining two symbols $z_3$ and $z_4$. QPSK, for instance, is used as the modulation method. In the embodiments of the invention, the matrices U and V are selected in such a manner that the code has full diversity, contrary to the prior-art 2+2 code that is according to equation (3).

In this preferred embodiment, the code matrices according to equation (10) are according to equation (16)

$$C = \begin{bmatrix} A & 0 \\ 0 & A \end{bmatrix} + U \begin{bmatrix} B & 0 \\ 0 & B \end{bmatrix} V, \quad (16)$$

where A and B are orthogonal 2*2 matrices in the form of the Alamout matrix. 0 is a 2*2 zero matrix and U and V are unitary 4×4 matrices in such a manner, however, that at least one matrix element in U or V is unequal to 0, ±1 and ±j. Let us now concentrate on the exemplary case, in which matrix V is a 4×4 singular matrix.

In the preferred embodiment, traceless non-orthogonality can be achieved for instance by setting $$U = \begin{bmatrix} qW & pW \\ pW & -qW \end{bmatrix},$$ (17)

where W is a unitary 2×2 matrix whose determinant is 1 and q and p are real numbers that fulfil the condition $$q^2 + p^2 = 1.$$ (18)

The codes having different values of q are fully equivalent to each other and the codes have the same eigenvalues of the squared difference matrix of the code words. To optimise performance, it is enough to examine one example of the above mentioned coefficients by setting q=0, whereby the code becomes $$C = \begin{bmatrix} A & WB \\ WB & A \end{bmatrix}.$$ (19)

From the form of matrix (19), it is possible to form both a power-balanced and a non-power-balanced block code. The power-balanced code means herein that each antenna transmits at a constant power at all time instants, if constant-power modulation, such as QPSK, is used, whereas in non-power-balanced code, the transmission power is not constant at all time instants. In a power-balanced block code, W is expected to be a diagonal matrix, for instance $$W = \begin{bmatrix} \lambda^{j\phi} & 0 \\ 0 & \lambda^{j\phi} \end{bmatrix}$$ (20)

where $\phi$ is selected so as to optimise performance. In the above, W is unitary and its determinant is 1. The code matrix is then in the form of equation (3), except that symbols $z_3$ and $z_4$ are multiplied by phase coefficient $\lambda^{j\phi}$. Each $\phi \neq 0$ makes the code a non-singular full diversity code of the invention. A second way of interpreting these inventive solutions is to think that in a code according to equation (3), the modulation points of symbols $z_1$ and $z_2$ are selected from $\{\pm 1, \pm j\}$, whereas symbols $z_3$ and $z_4$ are selected from the phase rotated constellation $\lambda^{j\phi}\{1, j, -1, -j\}$, where each $\phi \neq 0$ makes the code a non-singular full diversity code of the invention. In a partly non-power-balanced block code, matrix W can be selected to be a general unitary 2×2 matrix whose determinant is 1. These are of form $$W = \begin{bmatrix} \alpha & \beta \\ -\beta^* & \alpha^* \end{bmatrix},$$ (21)

where $\alpha$ and $\beta$ belong to complex numbers and the sum of the squares of their absolute values is 1. By combining the W described above with the Alamout block B described in formula (19)

$$B = \begin{bmatrix} z_3 & z_4 \\ -z_4^* & z_3^* \end{bmatrix},$$ (22)

the code matrix can be presented by means of pseudosymbols $$\tilde{z}_3 = e^{j\phi}(\alpha z_3 - \beta z_4^*)$$

$$\tilde{z}_4 = e^{j\phi}(\alpha z_4 - \beta z_3^*)$$ (23)

The code matrix can then be presented as $$C = \begin{bmatrix} A & \tilde{B} \\ \tilde{B} & A \end{bmatrix},$$ (24)

where $$\tilde{B} = \begin{bmatrix} \tilde{z}_3 & \tilde{z}_4 \\ -\tilde{z}_4^* & \tilde{z}_3^* \end{bmatrix},$$ (25)

In the code matrices of the invention, either $\alpha$ or $\beta$ or both are unequal to 0, ±1 and ±j. In non-power-balanced embodiments, both $\alpha$ and $\beta$ are nonzero. The non-orthogonality matrix is now $$X = 2\text{Re}[z_1 \tilde{z}_3^* + z_2 \tilde{z}_4^*] \begin{bmatrix} 0 & I_2 \\ I_2 & 0 \end{bmatrix},$$ (26)

where $I_2$ is a 2×2 singular matrix, and it is clearly traceless.

At a high signal-to-noise ratio, the eigenvalues of the squares $H_{ce}$ of the code matrix difference matrices according to equation (5) determine explicitly the performance of the code. The most important property of the difference matrices $H_{ce}$ is their rotatability, i.e. that all eigenvalues are nonzero. The code then obtains full diversity. This criterion is what is known as the rank criterion of space-time codes, namely that all code matrix pairs $C_c$ and $C_e$ have a difference matrix square $H_{ce}$ of maximum rank. The preferred embodiments of the present invention, for instance those according to equation (16), where U and V are according to the invention, fulfil the rank criterion; no square $H_{ce}$ of a code word difference matrix is singular, and the codes provide full diversity.

When the ranks of the matrices $H_{ce}$ are maximized, the distribution of their eigenvalues can next be maximized so as to provide as good a performance as possible. At high signal-to-noise ratios, this is achieved by maximizing the determinants of the matrices $H_{ce}$. According to the determinant criterion of the space-time codes, the smallest possible determinant of $H_{ce}$ should be maximized, when taking all code matrix pairs $C_c$ and $C_e$ into consideration. This is what is known as the MAX MIN DET criterion. In the preferred embodiments of the invention, the angle $\phi$ in equation (20), or in the non-power-balanced embodiments, the complex numbers $\alpha$ and $\beta$ in equation (21) can now be selected to be in accordance with the MAX MIN DET criterion.

If a lower signal-to-noise ratio is used, it is possible to minimize the bit error rate, for instance, with code matrices of a given form instead of using the determinant criterion.

The eigenvalues of the square $H_{ce}$ of a four-antenna block code difference matrix and thus also the determinant and bit error rate of $H_{ce}$ can be calculated exactly. The eigenvalues can be calculated from the traces of the first, second, third and fourth power of $H_{ce}$. The invariants $t_1$ to $t_4$ thus obtained for the code matrices according to the preferred embodiments of equation (16) are presented in equations (27). The thus formed eigenvalues of matrix $H_{ce}$ according to equation (5) are presented in equations (28) and the determinant is presented in equation (29).

$$t_1 = \Sigma |\Delta_i|^2 \qquad (27)$$

$$t_2 = 8(Re[\Delta_1\Delta_3{}^* + \Delta_2\Delta_4{}^*])^2 \qquad (27')$$

$$t_3 = 0 \qquad (27'')$$

$$t_4 = \frac{1}{4}t_2^2 \qquad (27''')$$

$$e1 = e2 = t_1 + \sqrt{\frac{t_2}{2}} \qquad (28)$$

$$e3 = e4 = t_1 - \sqrt{\frac{t_2}{2}} \qquad (28')$$

$$\det[H] = \left(t_1^2 - \frac{t_2}{2}\right)^2 \qquad (29)$$

In the above, $\Delta_i = z_i{}^c - z_i{}^e$ are symbol differences. In a non-power-balanced case according to equation (22), $\Delta_3$ and $\Delta_4$ should be interpreted as differences of pseudo-symbols $\tilde{z}_3$ and $\tilde{z}_4$. Equation (29) shows that the determinants of symbol difference pairs $\Delta_1$, $\Delta_3$ and $\Delta_2$, $\Delta_4$ can be maximized separately. If $\Delta_2 = \Delta_4 = 0$, it results in $$\det[H] = |\Delta_1{}^2 - \Delta_3{}^2|^4. \qquad (30)$$

According to the rank criterion, the modulation constellations are selected such that the determinant is never zero. The determinant is zero only if $\Delta_1 = \Delta_3$.

Figure 4A:
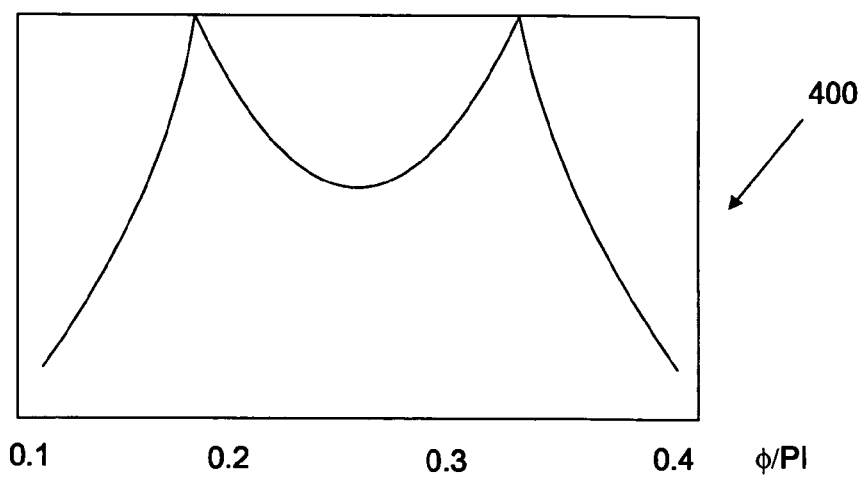
FIG. 4A illustrates preferred modulation phase factors by means of different determinant criteria.
Figure 4A:
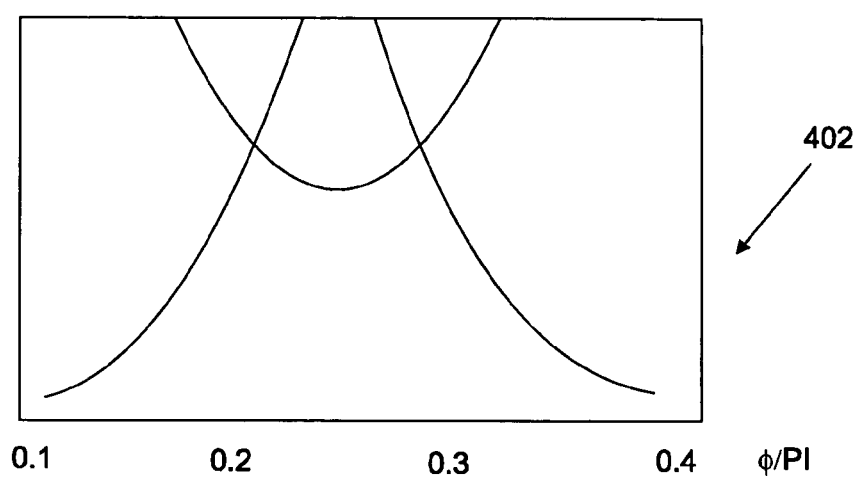
Figure 4A:
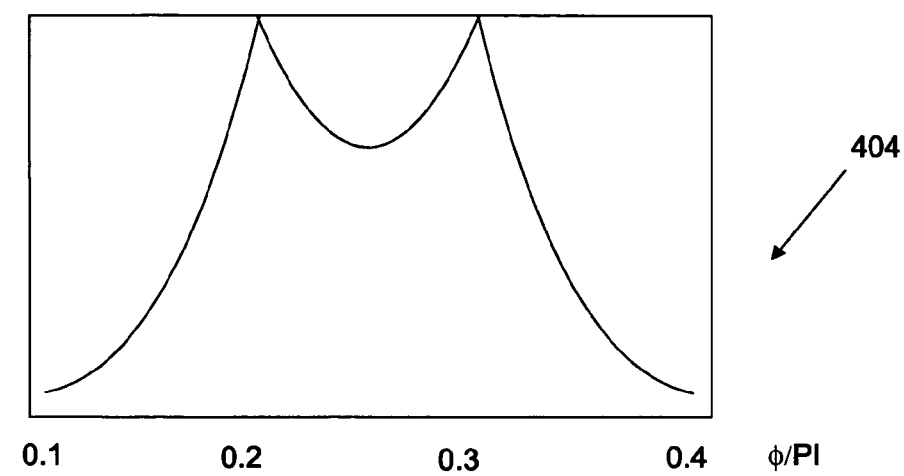
Figure 4B:
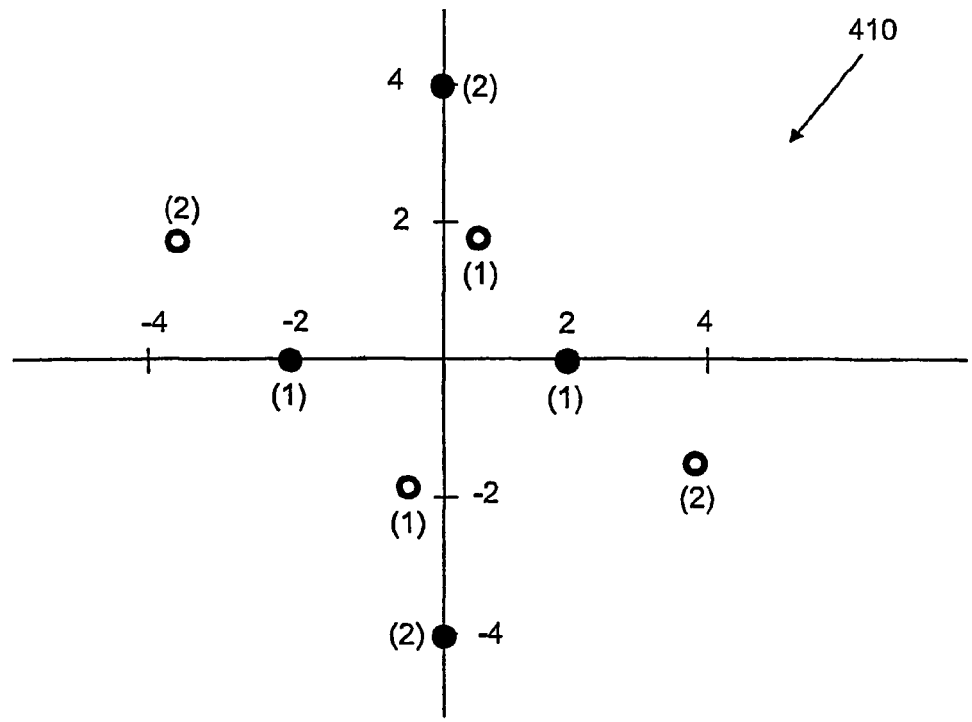
FIG. 4B illustrates symbol error squares with two different modulation phase factors.
Figure 4B:
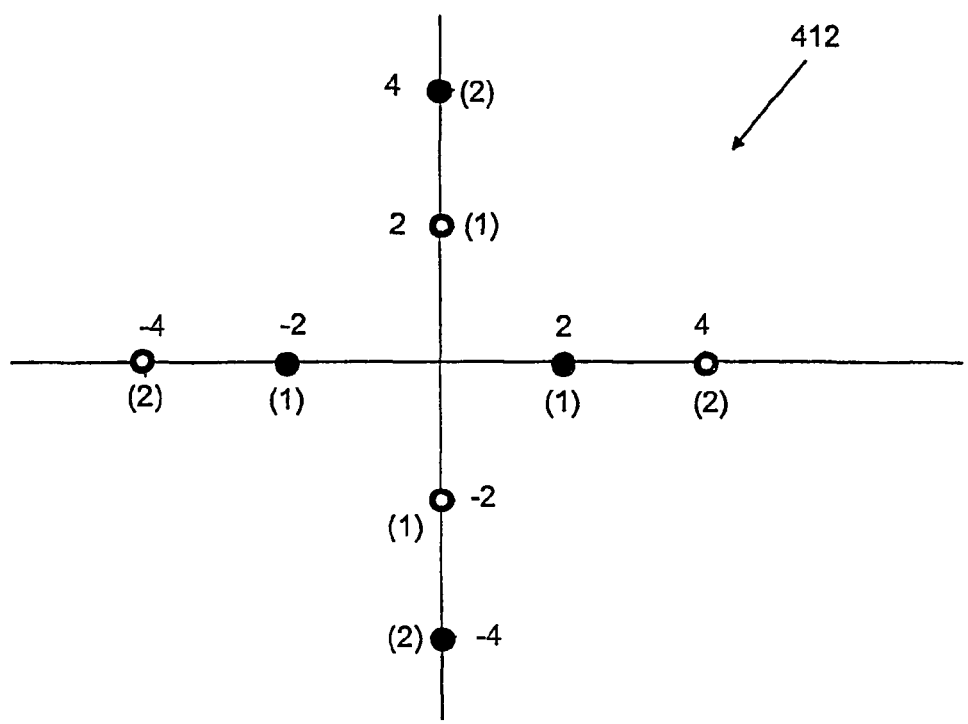

Thus, it is clear that the modulation constellations for symbols $z_1$ and $z_3$ should be selected in such a manner that they do not overlap. This can be done for instance by selecting the constellations with different phase factors $\phi$, as done in the preferred embodiments shown in equations (19, 20). In the case of QPSK modulation presented by way of example, the results of different optimisations can be seen in FIGS. 4A and 4B. The graphical presentation 400 of FIG. 4A shows an optimal phase rotation $\phi$ searched by the MAX MIN DET method. The MIN-DET of QPSK shows that the determinant for some two-symbol two-bit and four-bit errors disappears, when $\phi = 0, \pi/2$. For these values, the ABBA-code diversity is only 2. The optimal phase factors shown in FIGS. 4A and 4B are far from these singular values. It is thus essential for the present preferred embodiment that the modulation alphabet of one symbol is phase-rotated away from the presented singular points. The MAX MIN DET criterion obtains its optimum value with phase factor $$\phi = \frac{1}{2}\arccos\left[\left(2\sqrt{11} - \frac{3}{10}\right)\right] \approx 0.191\pi \approx 34° \qquad (31)$$

In the phase factor $\phi$ shown in equation (31), the minimum distance between points in a squared symbol difference alphabet for symbols $z_1$ and $z_3$ is at most as in the presentation 410 of FIG. 4B. The phase factor used in the presentation 412 is $\phi \cong \pi/4$. With reference to FIG. 4A, the determinants are examined not only by means of the two- and three-bit errors presented in the graphical presentation 402, but also by means of the relative number of error events according to the graphical presentation 404. This is based on the idea that the greater the number of combinations leading to a specific eigenvalue set, the more probable will bit errors caused by said occurrence be. In addition, it is possible to take into account the fact that a different number of bit errors occur in different error events. Therefore, the protection provided by the determinant should be divided by the number of bit errors and the relative number of error occurrences. The maximum of this criterion, MAX MIN DET/ERRS/FREQ is obtained by phase factor $\phi \approx \pi/5$. The above are only examples, and it is also possible to use other criteria for finding the optimal phase factor. For instance the union bound criterion, in which the union bound limit of the number of bit errors caused by different error occurrences is minimized, produces $\phi \approx 0.183\pi$. With the exception of the MAX MIN DET criterion, in other criteria the number of reception antennas may affect the optimum value. If there are L reception antennas, for instance, the MAX MIN DET/ERRS/FREQ criterion should maximize the $L^{th}$ power of the determinant divided by the number of bit errors and the relative number of error events. The optimum rotation angles for one reception antenna are shown herein. The optimum rotation angle is close to the value $\phi \approx 0.2\pi \approx 36°$ with all criteria. According to FIG. 4B, the performance of the code depends only slightly on the value of the rotation angle $\phi$ around the optimum values; $\phi$ can vary between 25° and 65° without a big change in the performance of the code. Thus, in one popular embodiment, $\phi = 45°$ is selected, which makes the technical implementation of the apparatus easier. In this case, it can be thought that all symbols are taken from an 8-PSK modulation constellation in such a manner that symbols $z_1$ and $z_2$ are taken from one QPSK sub-constellation of 8-PSK, and symbols $z_3$ and $z_4$ are taken from a complement of this sub-constellation.

A second way of ensuring that the determinant (29) is never lost is to select a non-power-balanced embodiment (19, 21). If both $\alpha$ and $\beta$ are nonzero, possible errors occurring in symbols $z_1$ and the pseudo-symbols $\tilde{z}_3$ of equation (23) can never be the same. The complex variables $\alpha$ and $\beta$ in W can be presented by means of three Euler angles.

$$\alpha = e^{i(\phi+\Phi)}\cos\theta$$

$$\beta = e^{i(\phi-\Phi)}\sin\theta. \qquad (32)$$

The union bound limit of the bit error rate is minimized by selecting $$\phi = \pi/8$$

$$\Phi = \pi/8$$

$$\theta = \pi/5. \qquad (33)$$

There are also some other angles that provide the same performance, but listing them herein is not essential.

It is clear that the method presented herein is not limited to the QPSK modulation method. For instance the MAX MIN DET calculated for the 16QAM modulation method is achieved by phase factor $\phi \approx 0.172\pi$. A second advantageous phase rotation for the 16QAM modulation method is about $\phi \approx \pi/4 \approx 45°$, which is again technically easier to implement than the optimal $\phi \approx 0.172\pi$.

The above describes the phase rotation of one symbol in the case of a 2+2 ABBA code. Equation (34) shows a non-orthogonal 3+1-form block code, in which symbols $z_1$, $z_2$ and $z_3$ are coded orthogonally with respect to each other, but symbol $z_4$ is not coded orthogonally with respect to any of the other symbols.

$$(z_1, z_2, z_3, z_4) \rightarrow \begin{pmatrix} z_1 & z_2 & z_3 & z_4 \\ -z_2^* & z_1^* & z_4 & -z_3 \\ -z_3^* & -z_4^* & z_1 & z_2 \\ -z_4^* & z_3^* & -z_2^* & z_1^* \end{pmatrix} \quad (34)$$

The code in formula (34) is thus not homogeneous at symbol level. In code matrix (34), the modulation points of symbols $z_1$, $z_2$ and $z_3$ preferably belong to the value range $\{+/-1, +/-j\}$. The optimal modulation points of symbol $z_4$ depend on the desired SNR, when the bit error rate is minimized. It has been noted that by minimizing the union bound limit of the bit error rate, the optimal phase shift for symbol $z_4$ is +/−29 degrees at an average signal-to-noise ratio of 10 dB. In practice, the phase shift of the alphabet of symbol $z_4$ can be selected freely between 25 and 65 degrees without a significant impact on the performance.

Figure 5:
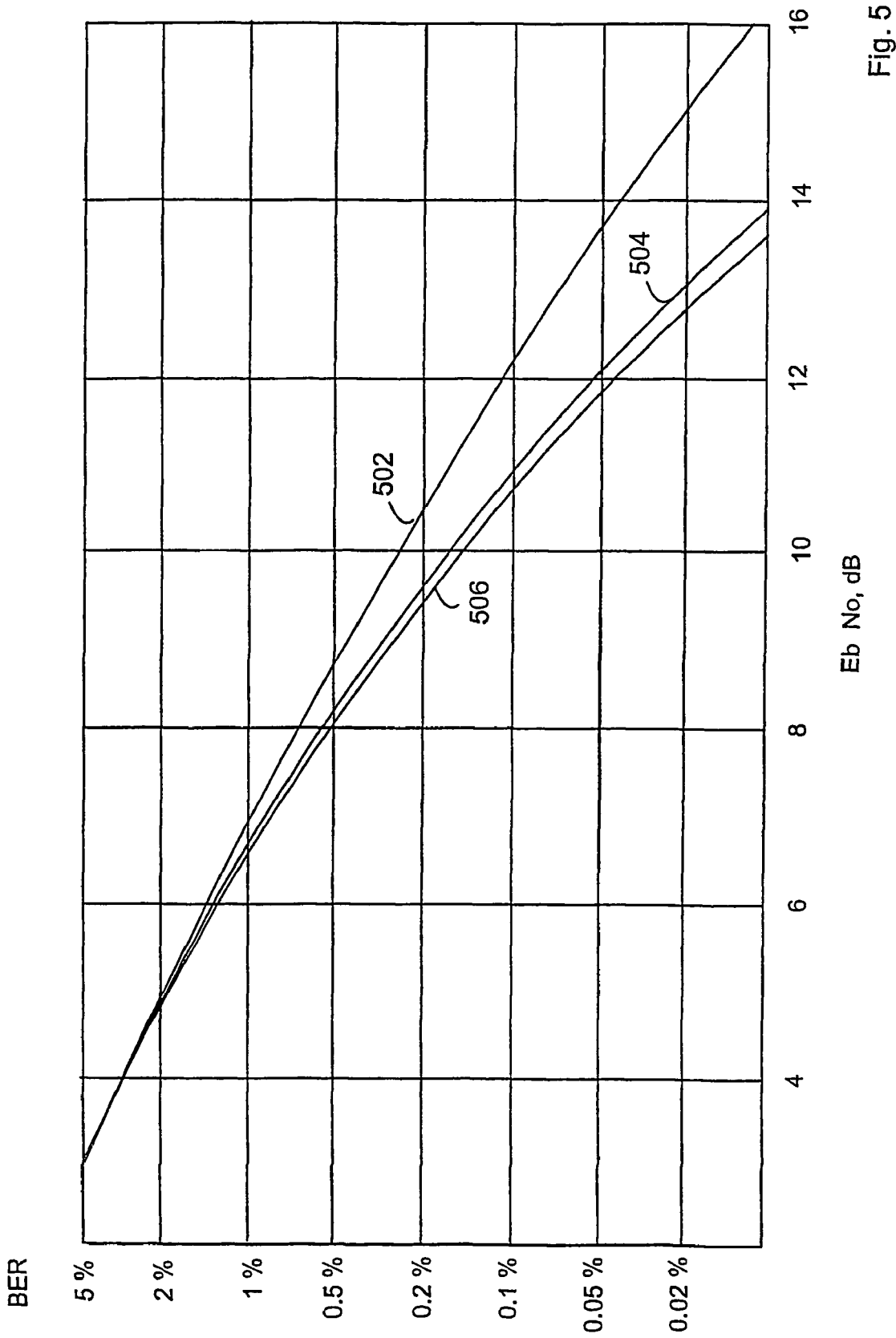
FIG. 5 describes bit error levels achieved by some preferred embodiments of the invention as a function of the signal-to-noise ratio.

A non-orthogonal 2+2 code optimized on the basis of the results obtained from simulations is always better with respect to bit error rate minimization than the known ABBA code shown in formula (3). FIG. 5 shows by way of example a simulation result, in which an ABBA code 502, optimized power-balanced code 504 and optimized non-power-balanced code 506 are compared with each other. In the figure, the bit error rate of the vertical axis is shown as a function of the signal-to-noise ratio of the horizontal axis. As can be seen from the figure, the best result is obtained with the non-power-balanced code, but the power-balanced code of the invention also produces significantly better results than the ABBA code, especially at high signal-to-noise levels. An optimized 3+1 non-orthogonal code that is non-homogeneous at symbol level is better than said ABBA code at signal-to-noise ratios >6.5 dB.

Let us now examine the receiver shown in FIG. 3. A signal 320 is transmitted by a transmitter of the invention using two or more antennas; in the figure, there are three antennas 314 to 318. The signal 320 is received in the receiver 302 with antenna 322 and taken to radio frequency parts 324. The number of antennas in the receiver is not significant to the invention. In the radio frequency parts 324, the signal 320 is converted to an intermediate frequency or baseband. The converted signal is taken to a channel estimator 326 that forms estimates for the channel, through which the signal has passed. The estimates can be formed by means of previously known bits in the signal, such as the pilot signal or training sequence. The signal is taken from the radio frequency parts to a decoder bank 328 that comprises a set of decoder units for decoding the coding done in a coder 308 at the transmitting end. Because a signal transmitted over a radio path often propagates along more than one route between the transmitter and receiver, the received signal comprises several multipath components. Each decoder unit processes one received signal component. The decoder units receive symbols transmitted in different time slots, on different frequencies or with different spreading codes, typically store them temporarily in a buffer memory and form estimates for the original block symbols by means of the channel estimates. From the decoder units, the decoded symbols are taken to a combiner 330, in which the signals of different paths are combined. The combiner can be implemented using the Rake technique, for instance, employing a maximum ratio combination technique. The channel estimator 326 transmits information on the estimated channel to the decoder units and the combiner. The channel estimator and the radio frequency parts can be implemented using known methods.

From the combiner, the signal is taken to a detector that detects symbols using detection methods. It is, for instance, possible to calculate the Euclidian distance of combined symbol estimates from possible symbol states or define the a posteriori probabilities of received symbols or bits. In the latter case, information on the channel needs to be obtained from the channel estimator. From the detector, the signal is taken to a channel decoder and on to other parts of the receiver. Symbol or bit interleaving and deinterleaving performed in both the transmitter and receiver and a possible channel coding are missing from the above description. These can be performed by known methods, if necessary. The above description is only one example of a possible receiver. The calculation and use of channel estimates, for instance, can be implemented in many ways, as is apparent to a person skilled in the art.

The facilities executing the steps of the invention in the coder and other parts of equipment belonging to the transmitter and arrangement are preferably implemented by program by means of a processor and suitable software in both the transmitting and receiving end. The facilities can also be implemented by means of separate components or circuits, for instance.

Even though the invention has been explained in the above with reference to examples in accordance with the accompanying drawings, it is apparent that the invention is not restricted to them but can be modified in many ways within the scope of the inventive idea disclosed in the attached claims.

The invention claimed is:

1. A method comprising:
reading at least two complex symbols belonging to a transmission block in a transmitter;
forming, by a processor, channel symbols from the symbols belonging to the transmission block based on a non-orthogonal block code, wherein the forming comprises multiplying at least one of the symbols belonging to the transmission block by a first nonzero weighting coefficient and at least one other symbol belonging to the transmission block by a second nonzero weighting coefficient, wherein the division ratio of the first and second weighting coefficients differs from values ±1 and ±j; and
providing the formed channel symbols for transmission via two or more transmission antenna routes.

2. A method as claimed in claim 1, further comprising transmitting the formed channel symbols by utilizing two or more data transmission resources.

3. A method as claimed in claim 2, wherein the data transmission resources are established by time, frequency or code division.

4. A method as claimed in claim 1, wherein the transmission antenna routes are two or more antenna lobes achieved using two or more antennas.

5. A method as claimed in claim 1, further comprising using two or more data transmission resources for each antenna route.

6. A method as claimed in claim 1, wherein the forming comprises forming the channel symbols to be transmitted to different antenna routes by using each data transmission resource in such a manner that at least one symbol belonging to the transmission block and utilizing the data transmission resource is multiplied by the first nonzero weighting coefficient and at least one other symbol belonging to the transmission block is multiplied by the second nonzero weighting coefficient, wherein the division ratio of the first and second weighting coefficients differs from values ±1 and ±j.

7. A method as claimed in claim 1, wherein the coding rate of the block code is higher than the coding rate allowed by orthogonality.

8. A method as claimed in claim 1, wherein the non-orthogonal block code has full diversity.

9. A method as claimed in claim 1, further comprising multiplying at least one read symbol by a weighting coefficient differing from coefficients ±1 and ±j.

10. A method as claimed in claim 1, wherein the forming comprises forming the channel symbols of the transmission block by using for at least one symbol belonging to the transmission block a phase-rotated modulation constellation in relation to a second symbol of the transmission block.

11. A method as claimed in claim 1, wherein the block code is unitary for the part of each symbol belonging to the transmission block.

12. A method as claimed in claim 1, wherein the non-orthogonal block code is selected such that a nonorthogonality matrix formed by means of the Hermitian square of the block code is traceless.

13. A method as claimed in claim 1, wherein the block code is made non-power-balanced.

14. A method as claimed in claim 1, wherein the block code is non-power-balanced.

15. A method as claimed in claim 1, wherein in the block code, at least two symbols are coded orthogonal with respect to each other.

16. A method as claimed in claim 1, wherein the transmission block comprises four symbols and the first two symbols are coded orthogonal with respect to each other and the last two symbols are coded orthogonal with respect to each other.

17. A method as claimed in claim 1, wherein the forming comprises forming complex channel symbols of the read symbols by means of block code C that is of form $$C = \sum_{k=1}^{K} C_k = \sum_{k=1}^{K} U_k \gamma_k V_k,$$

where k is a symbol index, $U_k$ is a unitary M×M matrix with M referring to the delay of the transmission, and $V_k$ is a unitary N×N matrix with N referring to the number of antennas, and where every matrix element of the primary diagonal of $\gamma_k$ is either a transmitted symbol $Z_k$ or its complex conjugate, and the matrices $U_k, V_k$ have at least one element differing from the values of the value range $\{0, \pm 1, \pm j\}$.

18. A method as claimed in claim 1, wherein the forming comprises forming complex channel symbols of the read symbols by means of block code C that is of form $$C = \begin{bmatrix} A & 0 \\ 0 & A \end{bmatrix} + U \begin{bmatrix} B & 0 \\ 0 & B \end{bmatrix} V,$$

where A and B are orthogonal 2*2 matrices in the form of the Alamouti matrix, 0 is a 2*2 zero matrix and U and V are unitary matrices in such a manner that at least one matrix element in U or V is unequal to 0, +1, −1, +j and −j.

19. A method as claimed in claim 18, wherein at least one of the matrices U, V is of form $$\begin{bmatrix} qW & pW \\ pW & -qW \end{bmatrix}$$

where W is a 2*2 unitary matrix whose determinant is 1, and q and p are real numbers that realize the equation $$q^2 + p^2 = 1.$$

20. A method as claimed in claim 19, wherein the matrix W is $$\begin{bmatrix} e^{i\phi} & 0 \\ 0 & e^{-i\phi} \end{bmatrix}.$$

21. A method as claimed in claim 20, wherein the angle $\phi$ is selected from the range: approximately 34°, approximately 45°.

22. A method as claimed in claim 19, wherein the matrix W is $$\begin{bmatrix} \alpha & \beta \\ -\beta^* & \alpha^* \end{bmatrix},$$

where $\alpha$ and $\beta$ belong to complex numbers and fulfill the condition $|\alpha|^2 + |\beta|^2 = 1$.

23. A method as claimed in claim 22, wherein $$\alpha = e^{i\frac{\pi}{4}} \cos\frac{\pi}{5} \text{ and } \beta = \sin\frac{\pi}{5}.$$

24. An apparatus, comprising:
a coder configured to code digital symbols into channel symbols, wherein the coder is configured to:
read at least two complex symbols belonging to the same transmission block and, by use of a non-orthogonal block code defining the coding; and
form channel symbols of the symbols belonging to the transmission block by multiplying at least one symbol belonging to the transmission block by a first nonzero weighting coefficient and at least one other symbol belonging to the transmission block by a second non-zero weighting coefficient, wherein a division ratio of the first and second weighting coefficients differs from values ±1 and ±j; and
a transceiver operationally connected to the coder and configured to transmit the channel symbols to provide the formed channel symbols for transmission via two or more transmission antenna routes generated by means of one or more antennas.

25. An apparatus as claimed in claim 24, wherein the formed channel symbols are transmitted by utilizing two or more data transmission resources.

26. An apparatus as claimed in claim 25, wherein the data transmission resources are established by time, frequency or code division.

27. An apparatus as claimed in claim 24, wherein the transmission antenna routes are two or more antenna lobes achieved using two or more antennas.

28. An apparatus as claimed in claim 24, wherein the apparatus is configured to use two or more data transmission resources for each antenna route.

29. An apparatus as claimed in claim 24, wherein the apparatus is configured to form the channel symbols to be transmitted to different antenna routes by using each data transmission resource by multiplying at least one symbol belonging to the transmission block and utilizing the data transmission resource by the first nonzero weighting coefficient and at least one other symbol belonging to the transmission block by the second nonzero weighting coefficient, wherein the division ratio of the first and second weighting coefficients differs from values ±1 and ±j.

30. An apparatus as claimed in claim 24, wherein the coding rate of the block code is higher than the coding rate allowed by orthogonality.

31. An apparatus as claimed in claim 24, wherein the block code has full diversity.

32. An apparatus as claimed in claim 24, wherein the coder is configured to multiply at least one read symbol by a weighting coefficient differing from coefficients ±1 and ±j.

33. An apparatus as claimed in claim 24, wherein the apparatus is configured to transmit each symbol belonging to the transmission block to the radio path at least two different time instants.

34. An apparatus as claimed in claim 24, wherein the coder is configured to form the channel symbols of the transmission block by using for at least one symbol belonging to the transmission block a phase-rotated modulation constellation in relation to a second symbol of the transmission block.

35. An apparatus as claimed in claim 24, wherein the block code is unitary for the part of each symbol belonging to the transmission block.

36. An apparatus as claimed in claim 24, wherein a non-orthogonality matrix formed by means of the Hermitian square of the block code is traceless.

37. An apparatus as claimed in claim 24, wherein the block code is made non-power-balanced.

38. An apparatus as claimed in claim 24, wherein the block code is non-power-balanced.

39. An apparatus as claimed in claim 24, wherein in the block code, at least two symbols are coded orthogonal with respect to each other.

40. An apparatus as claimed in claim 24, wherein the block code is a block code for the purpose of transmitting four symbols, in which the first two symbols are coded orthogonal with respect to each other and the last two symbols are coded orthogonal with respect to each other.

41. An apparatus as claimed in claim 24, wherein the coder is configured to form complex channel symbols of the read symbols by means of the block code C that is of form $$C = \sum_{k=1}^{K} C_k = \sum_{k=1}^{K} U_k \gamma_k V_k,$$

where k is a symbol index, $U_k$ is a unitary M×M matrix with M referring to the delay of the transmission, and $V_k$ is a unitary N×N matrix with N referring to the number of antennas, and where every matrix element of the primary diagonal of $\gamma_k$ is either a transmitted symbol z_k or its complex conjugate, and the matrices $U_k$, $V_k$ have at least one element differing from the values of the value range $\{0, \pm 1, \pm j\}$.

42. An apparatus as claimed in claim 24, wherein the coder is configured to form complex channel symbols of the read symbols by means of block code C that is of form $$C = \begin{bmatrix} A & 0 \\ 0 & A \end{bmatrix} + U \begin{bmatrix} B & 0 \\ 0 & B \end{bmatrix} V,$$

where A and B are orthogonal 2*2 matrices in the form of the Alamouti matrix, 0 is a 2*2 zero matrix and U and V are unitary matrices in such a manner that at least one matrix element in U or V is unequal to 0, +1, −1, +j, −j.

43. An apparatus as claimed in claim 42, wherein at least one of the matrices U, V is of form $$\begin{bmatrix} qW & pW \\ pW & -qW \end{bmatrix}$$

where W is a 2*2 unitary matrix whose determinant is 1, and q and p are real numbers that realize the equation $$q^2 + p^2 = 1.$$

44. An apparatus as claimed in claim 43, wherein the matrix W is $$\begin{bmatrix} e^{i\phi} & 0 \\ 0 & e^{-i\phi} \end{bmatrix}.$$

45. An apparatus as claimed in claim 44, wherein the angle φ is selected from the range: approximately 34°, approximately 45°.

46. An apparatus as claimed in claim 43, wherein the matrix W is $$\begin{bmatrix} \alpha & \beta \\ -\beta^* & \alpha^* \end{bmatrix},$$

where α and β belong to complex numbers and fulfill the condition $|\alpha|^2 + |\beta|^2 = 1$.

47. An apparatus as claimed in claim 46, wherein $$\alpha = e^{i\frac{\pi}{4}} \cos\frac{\pi}{5} \text{ and } \beta = \sin\frac{\pi}{5}.$$

48. An apparatus comprising:
reading means for reading at least two complex symbols belonging to the same transmission block in the transmitter;
forming means for forming channel symbols from the symbols belonging to the transmission block based on a non-orthogonal block code by multiplying at least one symbol belonging to the transmission block by a first nonzero weighting coefficient and at least one other symbol belonging to the transmission block by a second nonzero weighting coefficient; wherein a division ratio of the first and second weighting coefficients differs from values ±1 and ±j; and
providing means for providing the formed channel symbols for transmission via two or more antenna routes.

* * * * *

UNITED STATES PATENT AND TRADEMARK OFFICE
CERTIFICATE OF CORRECTION

PATENT NO. : 8,031,800 B2
APPLICATION NO. : 10/450997
DATED : October 4, 2011
INVENTOR(S) : Tirkkonen It is certified that error appears in the above-identified patent and that said Letters Patent is hereby corrected as shown below:

Page 2, item (56), under "Other Publications", in Column 1, Line 15, delete "ISIT200I," and insert -- ISIT2001, --.

Page 2, item (56), under "Other Publications", in Column 1, Line 20, delete "Communicatio ns." and insert -- Communications. --.

Page 2, item (56), under "Other Publications", in Column 2, Line 52, delete "Proceddings" and insert -- Proceedings --.

Page 2, item (56), under "Other Publications", in Column 2, Line 68, delete "interferenc," and insert -- interference, --.

Column 17, line 21, in Claim 33, delete "at least" and insert -- at at least --.

Column 18, line 62, below "providing means for providing the formed channel symbols for transmission via two or more antenna routes." insert
-- 49. A method comprising:
reading at least two complex symbols belonging to a transmission block in a transmitter;
forming, by a processor, channel symbols from the symbols belonging to the transmission block based on a non-orthogonal block code, wherein the forming comprises forming complex channel symbols of the read symbols by means of block code C that is of form $$C = \sum_{k=1}^{K} C_k = \sum_{k=1}^{K} U_k \gamma_k V_k,$$

where k is a symbol index, $U_k$ is a unitary M×M matrix with M referring to the delay of the transmission, and $V_k$ is a unitary N×N matrix with N referring to the number of antennas, and where every matrix element of the primary diagonal of $\gamma_k$ is either a transmitted symbol $Z_k$ or its complex conjugate, and the matrices $U_k$, $V_k$ have at least one element differing from the values of the value range $\{0, \pm 1, \pm j\}$; and providing the formed channel symbols for transmission via two or more transmission antenna routes. --.

Signed and Sealed this
First Day of May, 2012

David J. Kappos
*Director of the United States Patent and Trademark Office*